United States Patent [19]

Pendergrass et al.

[11] Patent Number: 5,180,890
[45] Date of Patent: Jan. 19, 1993

[54] COMMUNICATIONS TRANSMISSION CABLE

[75] Inventors: Paul J. Pendergrass, Hudson; Edmund Allcock, North Attleboro, both of Mass.

[73] Assignee: Independent Cable, Inc., Hudson, Mass.

[21] Appl. No.: 665,562

[22] Filed: Mar. 3, 1991

[51] Int. Cl.$^5$ .............................................. H01B 7/08
[52] U.S. Cl. ............................... 174/117 F; 174/131 R; 385/103; 385/105
[58] Field of Search ......... 174/117 F, 117 FF, 131 R; 350/96.23; 385/103, 105

[56] References Cited

U.S. PATENT DOCUMENTS

| | | | |
|---|---|---|---|
| 3,887,265 | 6/1975 | Margolis et al. | 350/96.23 |
| 4,199,225 | 4/1980 | Slaughter et al. | 350/96.23 |
| 4,259,544 | 3/1981 | Litaeur | 174/102 R |
| 4,449,012 | 5/1984 | Voser | 174/117 F X |
| 4,467,138 | 8/1984 | Brorein | 174/115 |
| 4,518,830 | 5/1985 | Drexler et al. | 174/109 X |
| 4,638,117 | 1/1987 | Ney | 174/117 F |
| 4,741,594 | 5/1988 | Suzuki | 350/96.23 |
| 4,761,053 | 8/1988 | Cogelia et al. | 350/96.23 |
| 4,815,814 | 3/1989 | Ulijasz | 350/96.23 |
| 4,852,965 | 8/1989 | Millin et al. | 350/96.23 |
| 4,937,401 | 6/1990 | Lee | 174/117 F |

FOREIGN PATENT DOCUMENTS

| | | | |
|---|---|---|---|
| 2627174 | 12/1977 | Fed. Rep. of Germany | 350/96.23 |
| 1562676 | 3/1980 | United Kingdom | 350/96.23 |

Primary Examiner—Morris H. Nimmo
Attorney, Agent, or Firm—Choate, Hall & Stewart

[57] ABSTRACT

A communications transmission cable includes at least two jacket encased portions each joined to an adjacent jacket encased portion at a recessed section. Jacket encased portions include at least one conductor and at least one strength member, and are readily separated at each recessed section.

16 Claims, 4 Drawing Sheets

COMMUNICATIONS TRANSMISSION CABLE

BACKGROUND OF THE INVENTION

Communications transmission cables are extensively used to transport a variety of information from communication sources to receivers. For example, communications transmission cables are used to provide telephone service to customers. These cables may be underground service cables or aerial service cables. Because aerial communications transmission cables are suspended from poles to a customer's premises, it is desirable to provide these cables with structural support to resist various environmental forces.

It is well known in the communications transmission cable industry that structural support for aerial communications cables is achieved by encasing the communications conductors and strength members within a flexible jacket. For example, communications transmission cables are often formed with a figure eight cross-sectional area wherein a strength member is disposed in one loop of the figure eight and the communications conductors are disposed within the other loop of the figure eight. U.S. Pat. No. 4,761,053 teaches a communications transmission cable having strength members disposed within a flexible jacket on either side of the communications conductors and a jacket center recessed section.

Often it is desirable to separate the communications conductors, or conductor pairs, from one another for various communications transmission applications. It is important that each conductor, or conductor pairs, after separation, remain supported by its own strength member or members. The configuration of the communications transmission cable of the present invention provides continued structural support and jacket encasing for communications conductors once the conductors are separated.

SUMMARY OF THE INVENTION

A communications transmission cable includes a jacket having at least two jacket encased portions each joined to an adjacent jacket encased portion at a recessed section. Each jacket encased portion includes at least one conductor and at least one strength member and the jacket encased portions are readily separated at each recessed section. The conductors are supported by the strength members and the jacket. When the recessed section is severed, the conductors remain encased by the jacket encased portions and supported by the strength members and the jacket encased portions.

In the preferred embodiment, a polyvinyl chloride jacket comprises two jacket encased portions. Each jacket encased portion includes one bulbous section and one rectangular section attached to the bulbous section by a side recessed section. The bulbous section is attached to the bulbous section of another jacket encased portion by a center recessed section. Each bulbous section encases two flexible copper wire conductors covered with insulating sleeves and formed into a twisted pair. Each rectangular section encases one fiberglass strength member disposed along the horizontal axis of the jacket transverse cross-sectional area.

The strength members and the jacket provide support for the conductors. When the center recessed section of the jacket is severed along the jacket longitudinal axis, the conductors remain encased by the jacket encased portions and each pair of conductors is supported by a bulbous section, the attached rectangular section, and the strength member within the attached rectangular section.

Communications transmission cables are often cut along their jacket longitudinal axis for various communications transmissions applications. The primary advantage of the communications transmission cable of the present invention is that conductors remain encased by the jacket and supported by strength members and jacket after the jacket is cut along its longitudinal axis.

DESCRIPTION OF THE PREFERRED EMBODIMENT

Figure 1:
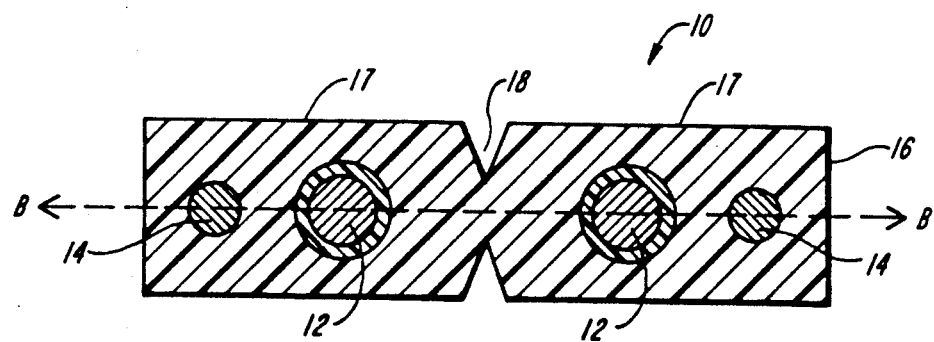
FIG. 1 is a front view of one embodiment of the communications transmission cable of the invention having a least one conductor within each jacket encased portion.
Figure 2:
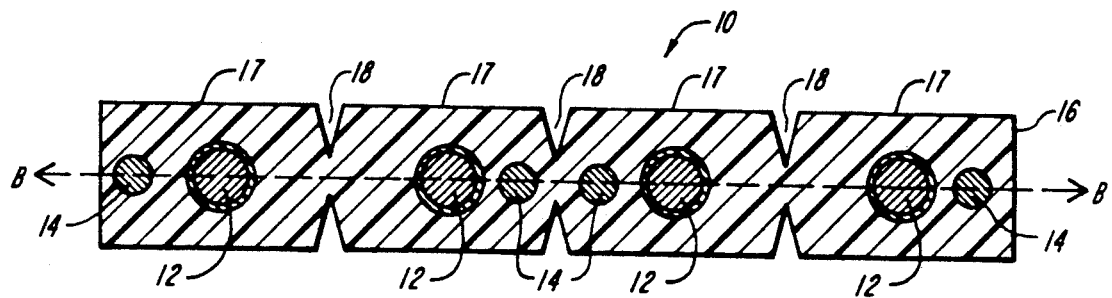
FIG. 2 is a front view of the communications transmission cable as shown in FIG. 1 having more than two jacket encased portions.
Figure 3:
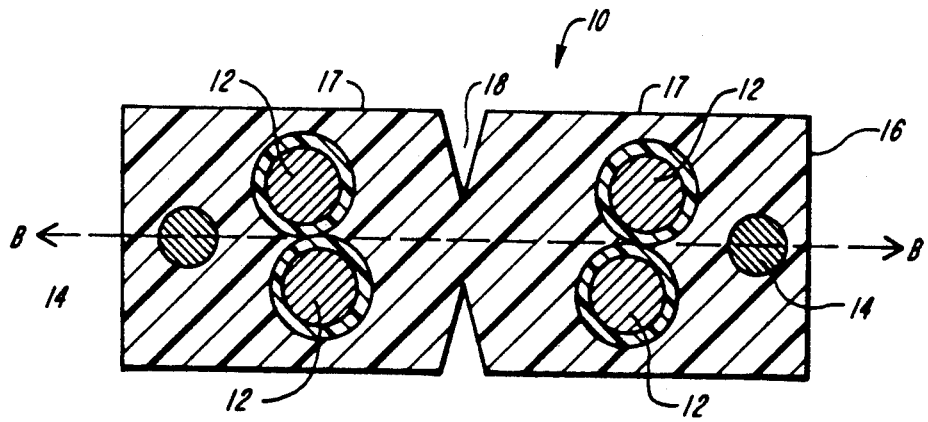
FIG. 3 is a front view of another embodiment of the communications transmission cable of the invention having one twisted conductor pair within each jacket encased portion.
Figure 4:
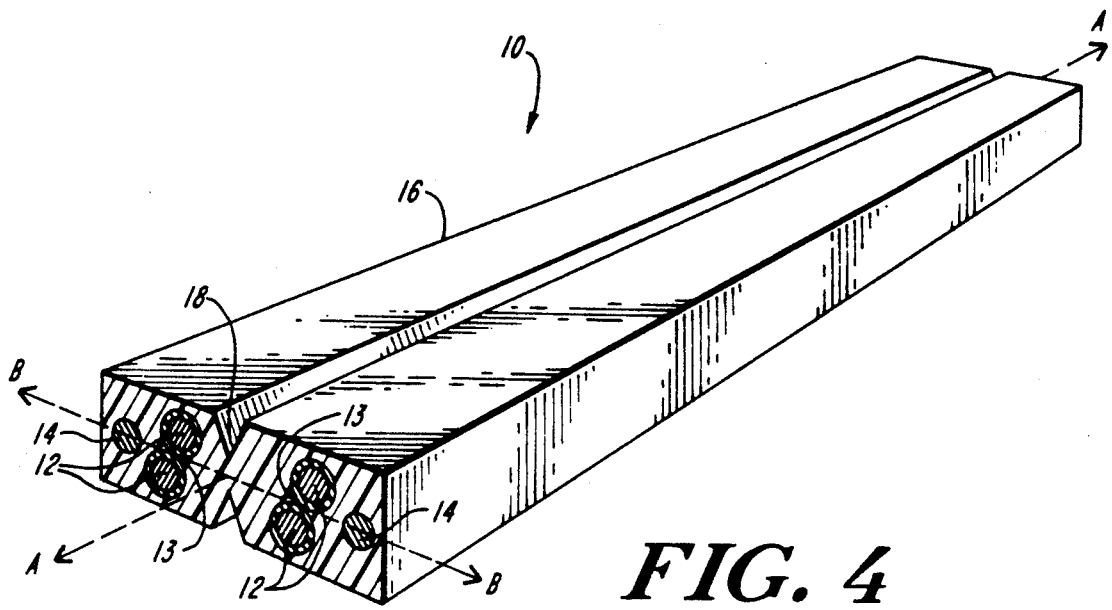
FIG. 4 is a perspective view of the communications transmission cable as shown in FIG. 3.
Figure 5:
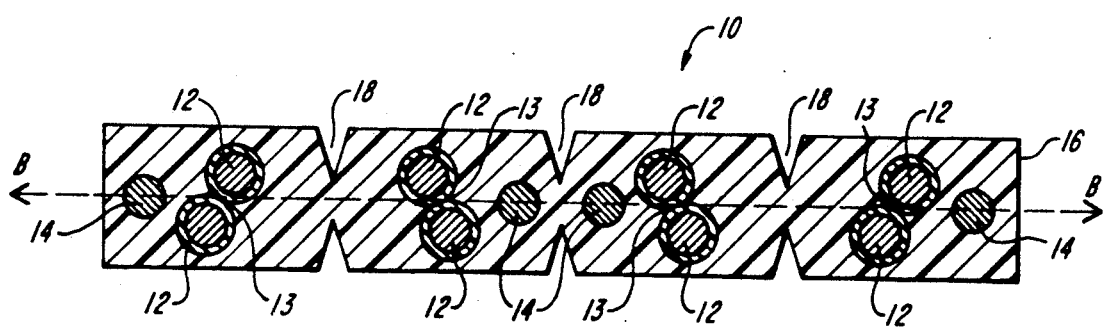
FIG. 5 is front view of the communications transmission cable as shown in FIG. 3 having more than two jacket encased portions.

As shown in FIG. 1, the communications transmission cable 10 includes a jacket 16 having two jacket encased portions 17 joined at recessed section 18. Each jacket encased portion 17 includes at least one conductor 12 and at least one strength member 14. The jacket encased portions 17 provide support for the conductors 12. When the recessed portion 18 is severed, the conductors 12 remain encased by the jacket encased portions 17 and supported by strength members 14 and jacket encased portions 17. FIG. 2 shows a communications transmission cable 10 of the invention having more than two jacket encased portions 17 each portion 17 including at least one conductor 12. FIGS. 3 and 4 show a communications transmission cable 10 of the invention having one twisted conductor pair 13 formed by two conductors 12 within each jacket encased portion 17. FIG. 5 shows a communications transmission cable 10 of the invention having more than two jacket encased portions 17 each portion 17 including one twisted pair 13.

Figure 6:
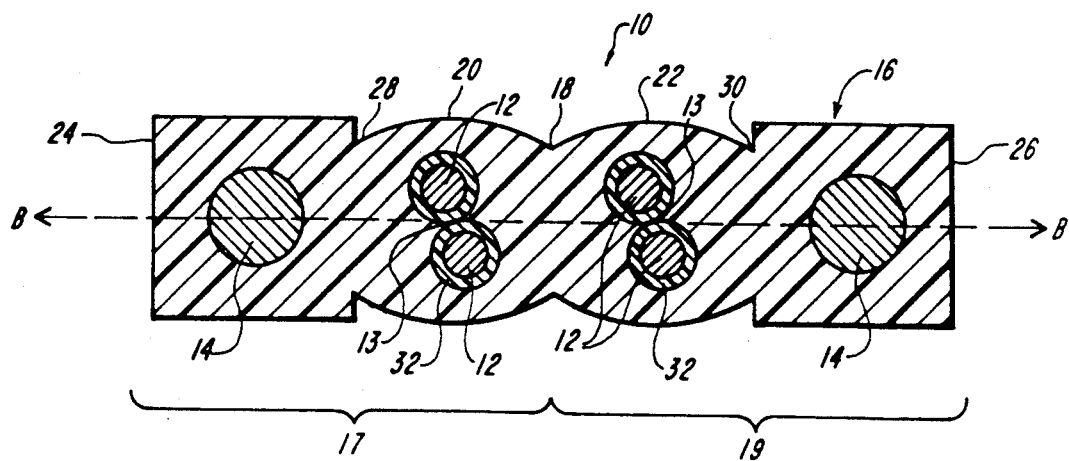
FIG. 6 is a front view of another embodiment of the communications transmission cable of the invention having two jacket encased portions each portion including a rectangular and bulbous section.
Figure 7:
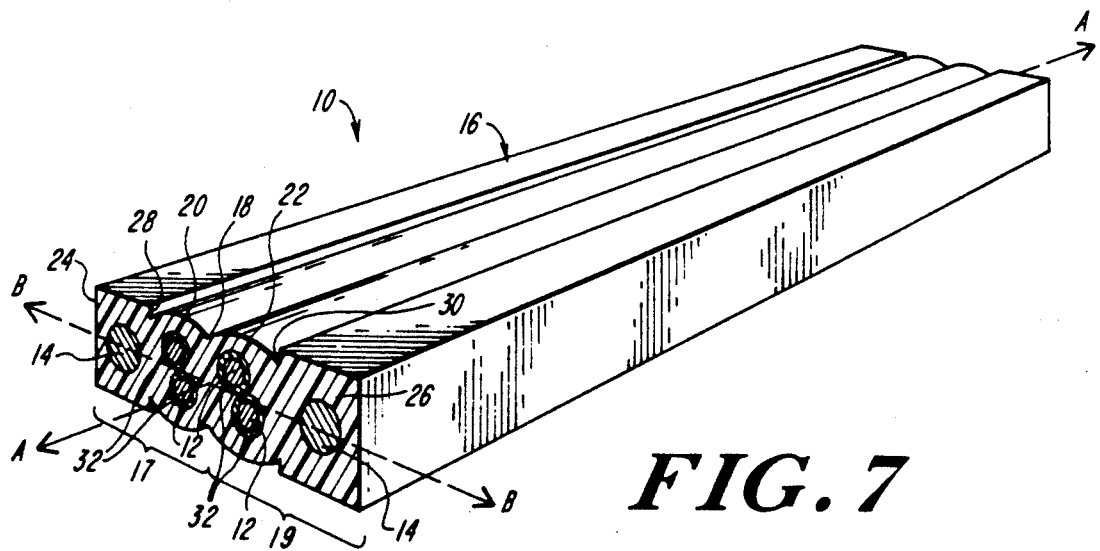
FIG. 7 is a perspective view of the communications transmission cable as shown in FIG. 6.
Figure 8:
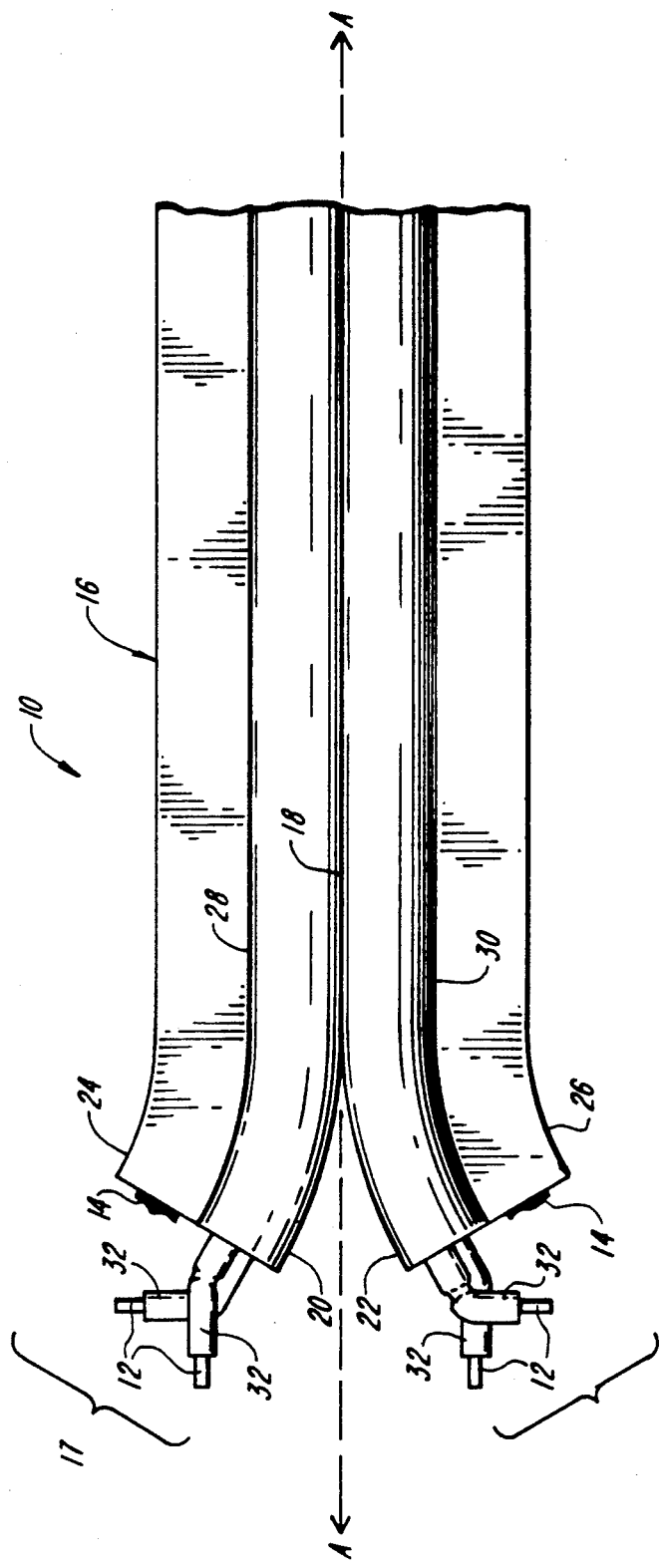
FIG. 8 is a top view of the communications transmission cable as shown in FIG. 6.

In the preferred embodiment, as shown in FIGS. 6, 7, and 8, a communications transmission cable 10 includes conductors 12, strength members 14, and a jacket 16. The jacket 16 includes a longitudinal axis A—A, a transverse cross-sectional area having a horizontal axis B—B, and first and second jacket encased portions 17 and 19. The first jacket encased portion 17 includes a first bulbous section 20 and a first rectangular section 24. The second jacket encased portion 19 includes a second bulbous section 22 and a second rectangular section 26. The first and second bulbous sections 20 and 22 are connected by a center recessed section 18 disposed along the jacket longitudinal axis A—A. The first rectangular section 24 is attached to the first bulbous section 20 at first side recessed section 28, and the second rectangular section 26 is attached to the second bulbous section 22 at a second side recessed section 30. The first and second side recessed sections 28 and 30, and center recessed section 18 are parallel to the jacket longitudinal axis A—A. The jacket 16 must be made of flexible, weatherized, and flame retardant material, such as polyvinyl chloride.

The conductors 12 of the communications transmission cable 10 are covered by insulating sleeves 32, form twisted pairs 13, and are encased by jacket 16. More specifically, as shown in FIGS. 6, 7, and 8, one twisted pair 13 is disposed within the first bulbous section 20, and another twisted pair 13 is disposed within the second bulbous section 22. The conductors 12 of twisted pairs 13 may be any conducting material such as 22AWG solid soft bare copper wire meeting the requirements of ASTM B-3. The insulating sleeves 32 may be any insulating material suitable for insulating communications transmission conductors such as high density polyethylene conforming to ASTM D-1248, Type III, Class A, Category 4 or 5, Grade E8 or E9.

The strength members 14 of the communications transmission cable 10 are encased by jacket encased portions 17 and 19. As shown in FIGS. 6 and 7, one strength member 14 is disposed within the first rectangular section 24, and one strength member 14 is disposed within the second rectangular section 26. Each strength member 14 is positioned within the jacket 16 along the jacket horizontal axis B—B. The strength members 14 may be any flexible supporting material such as fiberglass fibers of sufficient strength to withstand environmental forces. It is preferred that the strength members withstand at least a 290 pound load.

When the first and second bulbous sections 20 and 22 are joined by the center recessed section 18, the conductors 12 are supported by the entire jacket 10 and strength members 14. It is often necessary, however, to separate the conductors 12 for various communications transmission applications by cutting the jacket 16 along its center recessed section 18. The communications transmission cable 10 of the present invention provides continued structural support for communications transmission conductors 12 after the jacket 16 is cut. As shown in FIG. 8, when the center recessed section 18 is severed along the jacket longitudinal axis A—A, the conductors 12 encased by the first bulbous section 20 remain supported by the first jacket encased portion 17 and the strength member 14 encased by the first jacket encased portion 17. The conductors 12 encased by the second bulbous section 22 remain supported by the second jacket encased portion 19 and the strength member 14 encased by the second jacket encased portion 19.

What is claimed is:

1. A communications transmission cable comprising
a jacket having
at least two jacket encased portions, each joined to at least one adjacent, jacket encased portion at a recessed section;
wherein
each jacket encased portion includes at least one conductor spaced apart from and approximately parallel to at least one strength member;
whereby
the jacket encased portions are readily separable at each recessed section.

2. A communications transmission cable comprising
a longitudinal axis; and
a jacket having
two jacket encased portions joined to at a recessed section;
wherein
each jacket encased portion includes at least one conductor spaced apart from and approximately parallel to at least one strength member, and the recessed section is disposed along the longitudinal axis; whereby
the jacket encased portions are readily separable at the recessed section.

3. The communications transmission cable of claim 2 wherein
one-half of the conductors and one-half of the strength members are included in each jacket encased portion.

4. The communications transmission cable of claim 1 or 2 wherein
the conductors are supported by the strength members and the jacket encased portions; and,
when a recessed section is severed, the conductor or conductors within each portion remain encased and supported by that jacket encased portion and supported by at least one strength member.

5. A communications transmission cable comprising
at least two conductors;
at least two strength members; and
a jacket having
at least two jacket encased portions;
a longitudinal axis; and
a center recessed section discontinuous with the surface of the jacket;
wherein
each jacket encased portion includes at least one conductor and at least one strength member; and
the centered recessed section is disposed along the jacket longitudinal axis;
whereby
the conductors are supported by the strength members and jacket encased portions; and,
when the center recessed section is severed along the jacket longitudinal axis, the conductors within each portion remain encased and supported by that jacket encased portion and supported by at least one strength member.

6. The communications transmission cable of claim 5 wherein
a portion of the conductors and a portion of the strength members are disposed on either side of the center recessed section.

7. The communications transmission cable of claim 5 wherein
one-half of the conductors and one-half of the strength members are disposed on either side of the center recessed portion; and
when the center recessed section is severed along the jacket longitudinal axis, the conductors remain encased by the jacket encased portions and each half of the conductors is supported by one-half of the strength members and a jacket encased portion.

8. The communications transmission cable of claim 1, 2, or 5 wherein
the conductors within each jacket encased portion form twisted pairs.

9. The communications transmission cable of claim 5 wherein each jacket encased portion includes a bulbous section and a rectangular section connected to the bulbous section by a secondary recessed section; wherein
each bulbous section encases at least one conductor; and
each rectangular section encases at least one strength member;
whereby,
when the center recessed section is severed along the jacket longitudinal axis,
the conductor or conductors within each bulbous section remain encased by the bulbous section, and remain supported by the bulbous section, the attached rectangular section, and the strength members within the attached rectangular section.

10. The communications transmission cable of claim 9 wherein
the cable has two jacket encased portions; and
each bulbous section encases one-half of all conductors; and
each rectangular section encases one-half of all strength members.

11. The communications transmission cable of claim 1, 2, or 5 wherein each conductor is insulated.

12. A communications transmission cable including
at least two conductors covered with insulating material and formed into twisted pairs;
at least two strength members; and
a jacket having
a longitudinal axis,
at least one principal recessed section, and
at least two jacket encased portions attached together at a principal recessed section, each portion including a bulbous section and a rectangular section attached to the bulbous section by a secondary recessed section;
wherein
the center, principal recessed section is disposed along the jacket longitudinal axis, each bulbous section encases a fraction of all conductors, and each rectangular section encases a fraction of all conductors; and each rectangular section encases a fraction of all strength members;
whereby
the conductors are supported by the strength members and the jacket encased portions; and, when a principal recessed section is severed, the conductors within each portion encased portion remain encased by that portion's bulbous section, and supported by the bulbous section, an attached rectangular section, and the strength members within the attached rectangular section.

13. The communications transmission cable of claim 1, 2, 5 or 12 wherein
the transverse cross-sectional area of the jacket includes a horizontal axis; and
the strength members are disposed along the jacket horizontal axis.

14. The communications transmission cable of claim 1, 2, 5 or 12 wherein
the transverse cross-sectional area is generally rectangular.

15. The communications transmission cable of claims 1, 2, 5 or 12 wherein
the conductors are flexible copper wires covered with insulating material;
the strength members are flexible fiberglass members; and
the jacket is flexible polyvinyl chloride.

16. The communications transmission cable of claims 1, 2, 5, or 12 wherein
four copper wires are the conductors; and
two fiberglass members are the strength members.

* * * * *